March 2, 1965

C. R. TAPLEY ETAL 3,171,627

EXTENSIBLE SHORING DEVICE

Filed April 19, 1962

INVENTORS
Charles R. Tapley
William B. Mason
By Bedell and Burgess
Atty's 3,171,627
EXTENSIBLE SHORING DEVICE
Charles R. Tapley and William B. Mason, Memphis, Tenn., assignors to Union Metal Products Incorporated, Memphis, Tenn., a corporation of Tennessee
Filed Apr. 19, 1962, Ser. No. 188,799
10 Claims. (Cl. 248—354)

The invention relates to shoring of a type used by contractors wherever bracing of walls, roofs, decks or the like during construction or repairs is required, and for use in ship hull, bulkhead, deck, etc. repairs.

The main objects of the invention are to facilitate quick application of the shores and associated bracing to the wall etc. to be braced and irrespective of the angle between the wall and the ground or other structure to which the shore extends.

A more specific object is to provide for quick rough adjustment of the shore in its initial installation and, with simple mechanism, to effect further finer adjustment by jack-like mechanism.

In the accompanying drawings illustrating a selected embodiment of the invention and the application thereof to a specific installation:

FIG. 1 illustrates in part the hull, wall or bulkhead of a ship with adjacent upper and lower decks and a pair of shores holding a plug or patch to the hull and braced against the upper and lower decks respectively.

FIG. 2, drawn to a larger scale, is an exploded view of one of the shores shown in FIG. 1.

Figure 1:
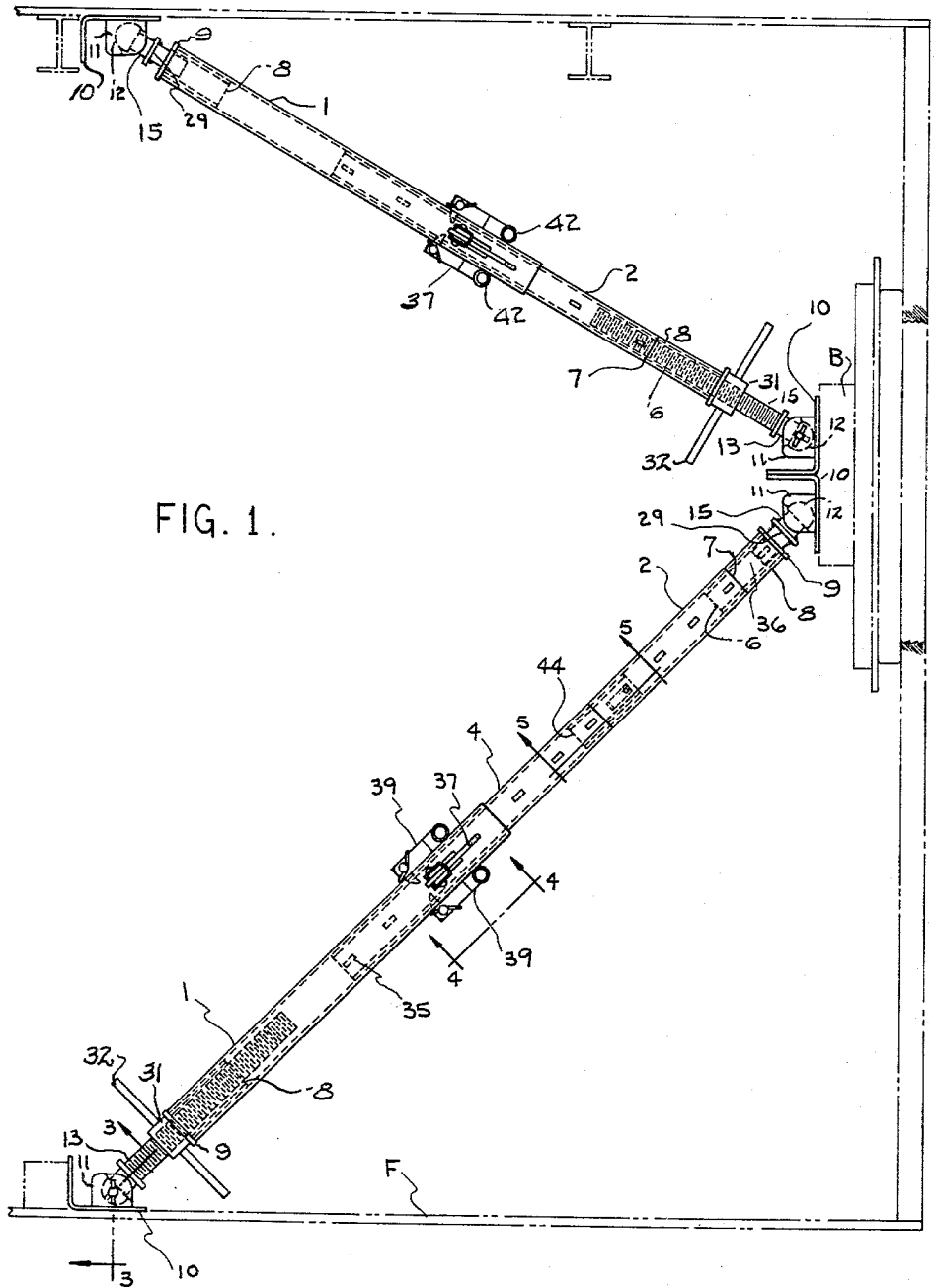
Figure 2:
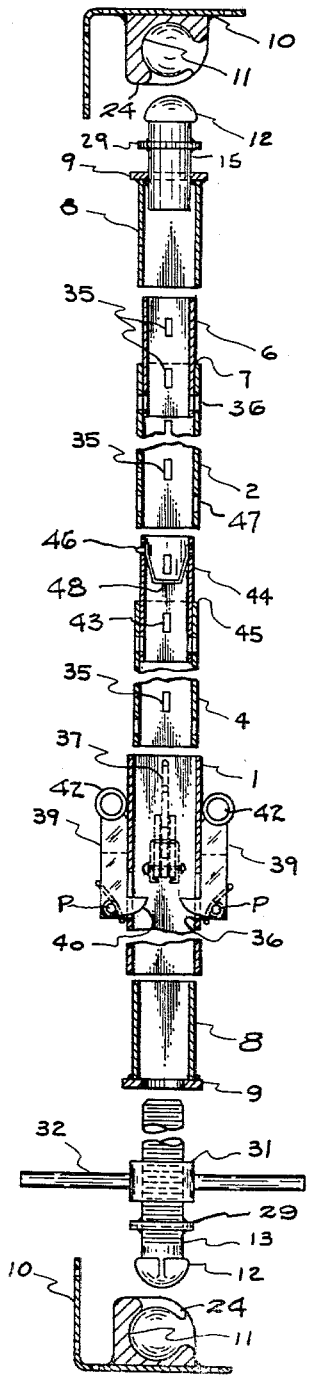
Figure 3:
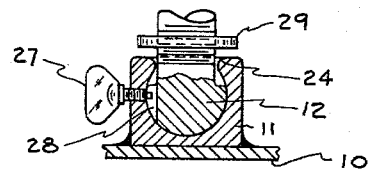
FIG. 3 is a detail section on line 3—3 of FIG. 1.

Each of the shores shown in FIG. 1 embodies essentially an outer tube 1 and an inner tube 2 both preferably of square cross section telescopingly assembled with each other, as indicated in the upper shore, or with one or more intermediate extenders 4 as indicated in the lower shore. The smaller diameter inner tube 2 forms a square shoulder 7 at one end surrounding a reduced diameter projection 6. Each outer end of the shore includes a sleeve 8 having an apertured collar 9 at its outer end. The outside diameter of the sleeve is small enough to be slid within the larger diameter outer tube 1, until collar 9 engages the end of the tube. The sleeve diameter is large enough to receive the projection 6 on the ends of the smaller inner tube 2 and abut shoulder 7 formed by the end of tube 2 proper.

At opposite ends of each shore is an adaptor each including an L-shaped bracket 10 provided with a socket 11 which receives a ball element 12 on the end of a shank 13, 15 respectively. The bracket and ball-shank parts of each adaptor are preferably held assembled by the inturning of the socket lip 24 over the ball 12 whereby the ball-shank member may pivot universally. Preferably a wing screw 27 is threaded through the side of the socket and projects into a groove 28 in the side of the ball. When the screw is advanced into the slot, then movement of the shank about the bracket is limited to rotation in a single plane about an axis substantially parallel to the bracket flanges. Further insertion of the screw will hold the bracket and shank against any relative movement. Spaced a short distance from each ball 12 is a transverse plate 29 welded to the shank and forming a stop limiting the insertion of the shank into a tube.

At least one shank on each shore is threaded throughout its length and a nut 31 with laterally extending handholds 32 is rotatable upon the threaded shank. Sleeve 8 slidably receives the threaded shank of the adaptor but collar 9 forms a bearing for the opposing face of nut 31 so that when the nut is bearing against the collar and is rotated, it may elongate the shore.

Figure 4:
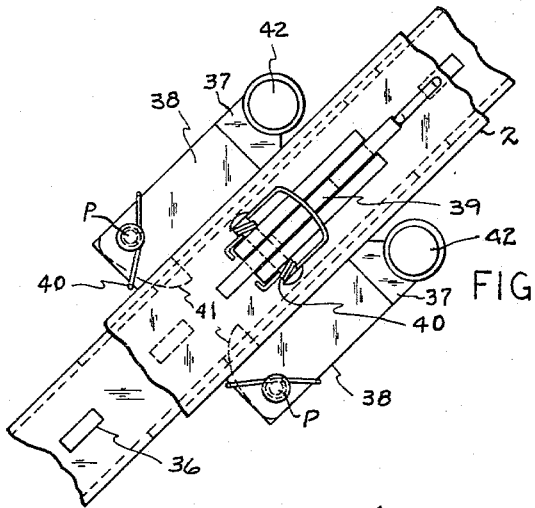
FIG. 4 is a detail view indicated by line 4—4 of FIG. 1.
Figure 5:
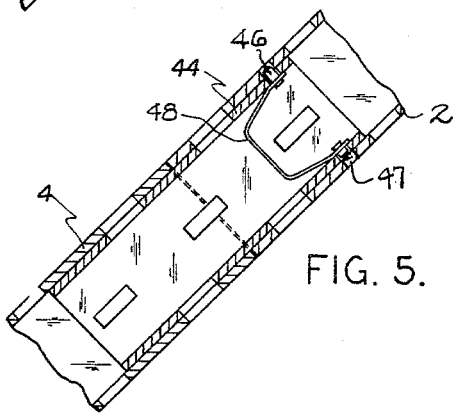
FIG. 5 is a detail section on line 5—5 of FIG. 1.

Smaller diameter tube 2 has apertures 35 in two opposite walls at intervals throughout the length of the tube including projection 6. Similar apertures 36 in the other two walls are offset lengthwise of the tube intermediate successive apertures 35. Larger diameter tube 1 has elongated detents 37 opposite to each other and pivoted at P to flanges 38 on the tube outer wall, and similarly opposite detents 39 pivoted to the other two opposite sides of the tube and spaced lengthwise of the tube from detents 37 a distance equal to one half the space between successive apertures in tube 2. Springs 40 thrust the detents toward the tube walls. The swinging end of each detent includes a laterally extending tooth 41, and the tube has a corresponding opening permitting the tooth to move to the position shown in FIG. 4 in which it enters an aperture in the inner tube and its inner face, normal to the length of the detent, engages the edge of the aperture and prevents telescoping (shortening) of the shore under load. By pulling a pair of opposite rings 42 away from the tube, the corresponding teeth 41 are swung out of apertures 35 and the shore may be telescoped farther. The outer face of each tooth is so inclined to the tube wall that during elongation of the shore the detents ride easily in and out of the successive apertures.

A ready means for modifying the length of the shore is provided by use of one or more extenders 4, each corresponding to a small diameter tube 2 and similarly apertured at 43 and provided with a projection 44 corresponding to projection 6 and receivable in the larger end of a tube 2, or in an adjacent extender, and forming an abutment shoulder 45 limiting the telescoping of the tube and extender. A U-shaped spring 48 has lugs 46 at the ends of its legs seated in round openings in projection 44 and in similar openings 47 in the larger end portion of the associated tube 2 and holding the small tube 2 and extender assembled. The larger end of the extender telescopes into an end of the larger tube 1 and the extender apertures 43 are engageable by detents 37 similarly to the engagement of the apertures in tube 2 as described above.

With the above described construction a two-part shore which is three feet long when telescoped may be quickly elongated to five feet and the jack screw 13 projected another foot or so. Or a two-part shore having a telescoped length of six feet may be quickly elongated to eleven feet and then further projected by the jack screw. Any number of extenders, about three feet long, may be added to the main tubes to increase the length of the shores in multiples of three feet.

Operation: One end of the shore with its adaptor is held against a support such as floor F and the other end is with its adaptor pulled or pushed to abut a wall bracing or cover device B. This elongation will be accompanied by the detents 37, 39 riding freely through successive apertures 35, 36. The slots as shown are about 1¾ inches long and are spaced at about 4½ inch intervals. Then nut handholds 32 are readily grasped to rotate the nut and apply pressure to the adaptors at the ends of the shore, the adaptors will take any angle required to furnish a firm thrust bearing.

The time involved in lengthening the shore is only five or ten seconds and no tools of any kind are required. The shores may be applied without lighting facilities and under water if necessary. This makes them well adapted for use in repairing bulkheads in ships at sea.

The screw jack 13 and the plain shank 15 may be quickly applied or interchanged at either end of the shore or the shank may be welded to one end of a shore tube to prevent disassembly.

FIG. 1 shows two shores angled into each other at the right hand end of the figure and individually set against spaced decks at their opposite ends. Various combinations of coacting shores are readily effected where they can be braced against each other to secure advantageous results.

The details of the structure may be varied without departing from the spirit of the invention and the exclusive use of those modifications coming within the scope of the claims is contemplated.

What is claimed is:

1. A shore comprising elongated telescoping tubes, there being a series of openings spaced apart lengthwise of one tube
   and there being a detent pivoted on the other tube and riding over and into successive openings of said series when the tubes are moved axially relative to each other in one direction but positively engaging the edge of an entered opening when the tubes are moved relative to each other in the other direction,
   a sleeve telescopingly fitting the outer end of one of the tubes and having a transverse bearing plate at its outer end, an elongated threaded shaft slidable in the sleeve and the tube on which it is mounted,
   a nut on said shaft seated against said bearing plate and rotatable on the shaft for feeding the shaft lengthwise of the sleeve and tube, and a work-engageable member mounted on the outer end of the shaft, the sleeve and shaft being readily applicable to the outer end of either tube by insertion inwardly of the larger tube or insertion over the smaller tube.

2. In a shore, telescoping tubes fitting one within the other and slidable readily lengthwise of each other to elongate the shore,
   means automatically checking the tubes against movement to shorten the shore,
   a sleeve interchangeably fitting within the outer end of the larger tube and over the outer end of the smaller tube,
   said sleeve having a transverse bearing plate at its outer end engageable with the outer end of either tube to which it is applied,
   a shaft slidably and rotatably received within said sleeve and the tube to which it is applied,
   and a nut threaded on said shaft and seated against and rotatable on said bearing plate,
   there being a work-engageable part on the outer end of said shaft movable lengthwise of the tubes by the rotation of said nut.

3. In a shore, elongated inner and outer telescoping tubes slidably assembled with each other,
   the inner tube having a relatively short reduced-diameter shouldered projection extending axially beyond an outer end thereof,
   a similarly short sleeve corresponding in diameter to the inner tube and including a transverse bearing plate at one end,
   said sleeve being applicable, selectively, over said projection, to abut the end of the sleeve with the end of the inner tube, and inwardly of the outer tube to abut the bearing plate with the end of the tube,
   an elongated shaft slidably received in said sleeve and in the tube to which it is applied,
   and a nut threaded on said shaft and rotatably seated on the exterior of said bearing plate.

4. In a shore, a unit comprising a plurality of elongated aligned hollow tubes of equal outside diameter arranged end to end with adjacent ends abutting,
   one tube having on its abutting end a square shouldered projecting part, of smaller diameter than the main portion of the tube, fitting within the end of the other tube,
   said tubes providing a continuous rigid unit exterior wall of predetermined diameter from end to end,
   and a larger diameter tube unit slidable over said first-mentioned unit and having near one end a detent pivoted on the outer face of its wall and including a tooth movable inwardly through an opening in said wall,
   the tubes of the first-mentioned unit having a series of openings spaced apart from end to end of that unit adapted to receive said detent tooth to positively hold the larger diameter tube unit against movement in one direction along the smaller diameter inner tube unit,
   there being work-engageable parts on the remote outer ends of the assembled units.

5. In a shore, elongated telescoping tubes,
   the smaller diameter tube including a reduced diameter square shouldered end part having an outside diameter corresponding to the inside diameter of the remainder of the tube,
   and an extender part comprising a tube corresponding in outside diameter to the smaller diameter tube part and slidably fitting over said shouldered end part and abutting the end of the first-mentioned tube,
   and having a reduced diameter shouldered part at its other end corresponding to said first-mentioned shouldered part, said shouldered parts positively engaging the opposing end of an associated part and comprising therewith a rigid thrust transmitting structure.

6. In a shore, elongated inner and outer tubes slidable over each other to a selected relative position,
   the outer end of each tube being provided with an unyielding thrust-transmitting, work-engaging terminal having a rigid seat on the tube,
   at least one of said terminals comprising a threaded shank having a work-engaging end facing in one direction and a threaded nut on the shank having a base facing in the opposite direction to seat against the end of the associated tube,
   at least one of said terminals including an element inclinable to the length of the shore,
   means positively holding said tubes against telescoping movement from selected position and thereby positively maintaining said terminals at a selected minimum over-all distance apart while freely accommodating elongation of the shore,
   said means comprising a series of radial openings disposed in alignment lengthwise of one tube, an aperture in the other tube radially aligned with said series, and a detent having a pivot on the latter-mentioned tube at a point spaced from the aperture therein,
   said detent having a tooth movable transversely through said aperture and including an inclined forward edge, whereby the tooth is slidable into and out of successive openings on the other tube as the tubes are moved relatively to elongate the shore, and including a square rear edge engaging the end of an entered aperture and positively resisting relative telescoping movement of said tubes to shorten the shore.

7. A shore according to claim 6 in which each work-engageable end member is pivotable to the associated tube to swing transversely of the shore axis and has exterior surfaces facing away from the tubes and disposed angularly to the axis of the tubes and to each other to present a flat thrust surface in a selected direction opposite a work piece.

8. A shore according to claim 6 in which each work-engageable end member and the outer end of the associated tube include a universal joint between them, and the end members are movable selectively to direct their work-engaging faces in any desired angular direction relative to the axis of the tubes.

9. A shore as described in claim 6 in which the inner and outer tubes are of rectangular cross section and there are a plurality of series of radial openings running lengthwise of opposite walls of the one tube, and a corresponding detent for each series,
   the openings of each series, and the associated detent, being staggered lengthwise of the tubes relative to the openings and the detent of another series, so that telescoping movement of the tubes when a detent is withdrawn from an opening in one series will be limited to the distance the openings in the respective series are staggered.

10. In an elongated shore having thrust engaging ends and being normally rigid between said ends to positively transmit a thrust between work parts engaged by the shore ends, the shore including telescoping elongated tubes slidable longitudinally one within the other and provided with a detent device normally limiting their telescoping movements, a readily attachable and detachable unit with an end portion selectively applicable to seat on the outer end of either of the telescoping tubes, said unit comprising a sleeve applicable lengthwise outwardly of the outer end of one of the tubes and inwardly of the outer end of the other tube, and a shaft slidable lengthwise of and freely rotatable in the sleeve, a work-engageable member on the outer end of the shaft, and a nut threaded on the shaft and seated against the end of the sleeve.

References Cited in the file of this patent

UNITED STATES PATENTS

| | | |
|---|---|---|
| 1,227,105 | Barnes | May 21, 1917 |
| 1,699,276 | Boye | Jan. 15, 1929 |
| 1,890,423 | Teagarden | Dec. 6, 1932 |
| 2,164,609 | Cusick | July 4, 1939 |
| 2,482,979 | Isakson | Sept. 27, 1949 |
| 2,601,998 | Murray | July 1, 1952 |
| 2,610,875 | Wheelden | Sept. 16, 1952 |
| 3,096,065 | Horne | July 2, 1963 |

FOREIGN PATENTS

| | | |
|---|---|---|
| 556,291 | Belgium | Apr. 15, 1957 |
| 786,830 | Great Britain | Nov. 27, 1957 |
| 1,061,724 | Germany | July 23, 1959 |
| 1,122,475 | Germany | Jan. 25, 1962 |